UNITED STATES PATENT OFFICE.

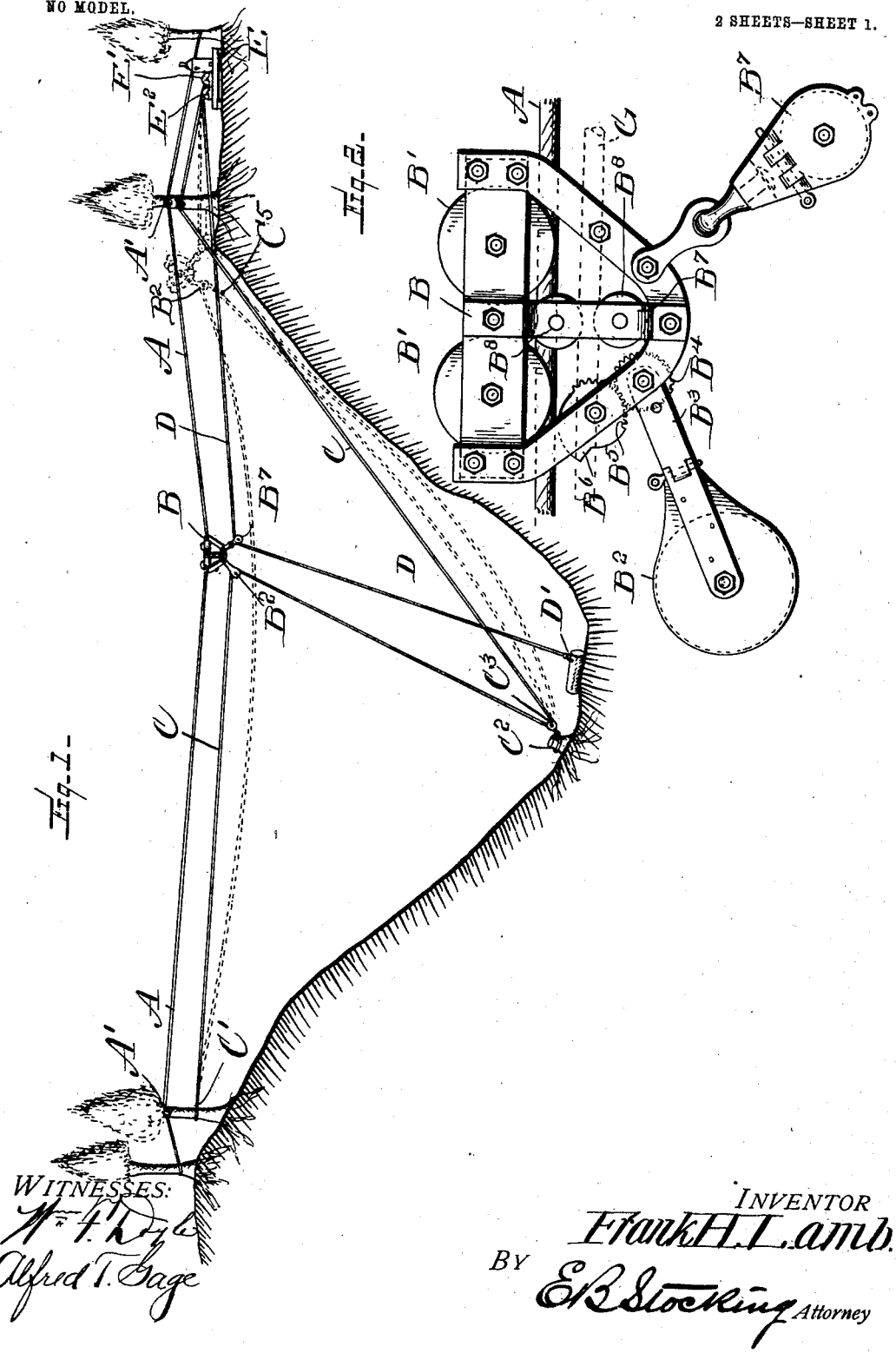

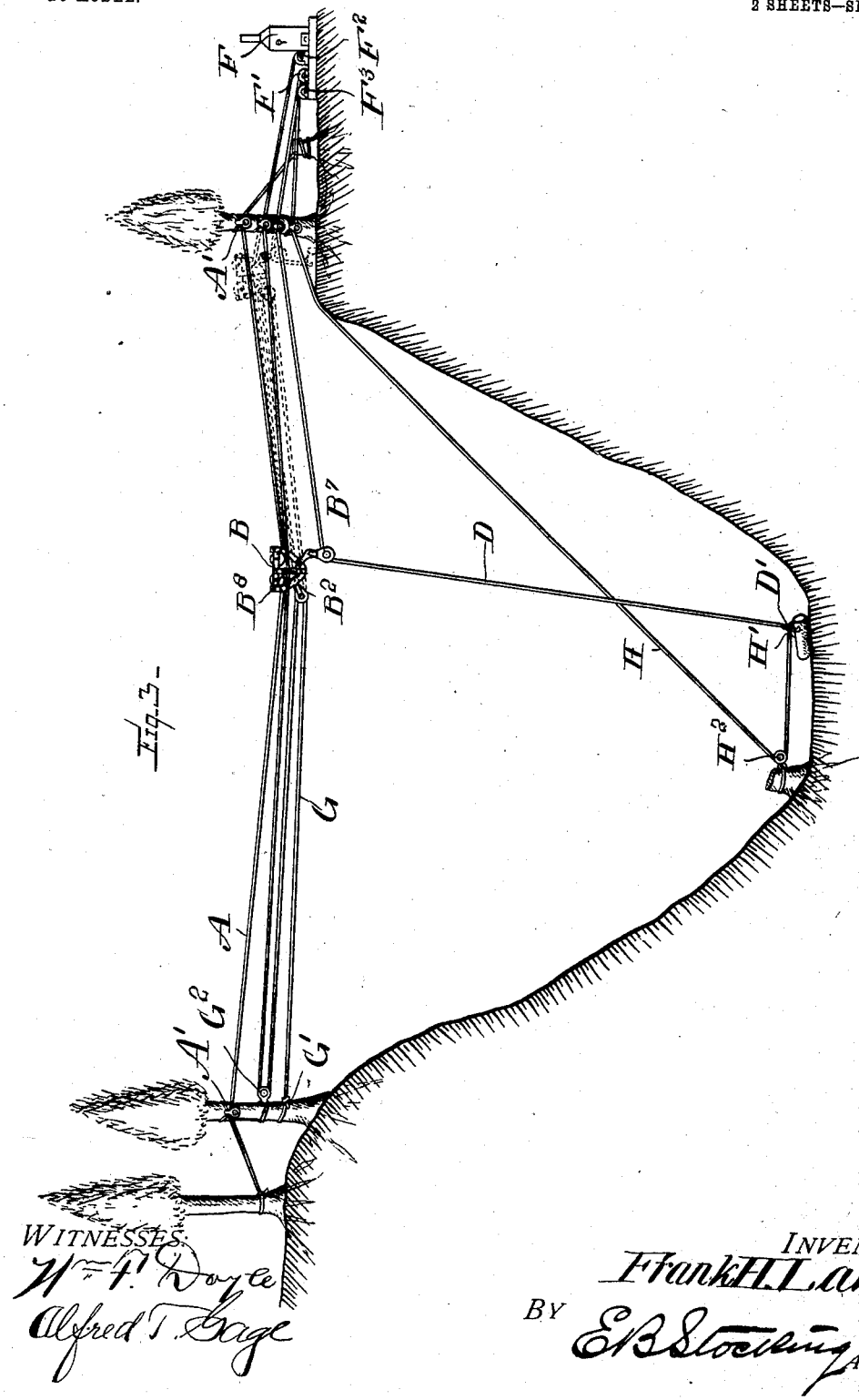

FRANK H. LAMB, OF HOQUIAM, WASHINGTON.

CABLEWAY SYSTEM.

SPECIFICATION forming part of Letters Patent No. 719,478, dated February 3, 1903.

Application filed May 21, 1902. Serial No. 108,404. (No model.)

*To all whom it may concern:*

Be it known that I, FRANK H. LAMB, a citizen of the United States, residing at Hoquiam, in the county of Chehalis, State of Washington, have invented certain new and useful Improvements in Cableway Systems, of which the following is a specification, reference being had therein to the accompanying drawings.

This invention relates to a cableway system, and particularly to a construction embodying a haulback-line adapted to return the carriage or traveler to any desired point and operate the brake thereon.

The invention has for an object to provide a system in which the traveler or carriage mounted upon a fixed way is supplied with a brake for engaging and holding the same at any desired point upon the way, which brake is adapted to be automatically operated by a haulback-line extending from a fixed point through the traveler to a hauling-engine, whereby a slackening of the line will set the brake to hold the traveler, while a tightening of the line will relieve this brake and permit the traveler to be drawn along the way by the hauling-line carrying the load.

A further object of the invention is to provide means for returning this hauling-line to a point of use adapted to be operated by the engine through the medium of a haulback-line.

Other and further objects and advantages of the invention will be hereinafter set forth and the novel features thereof defined by the appended claims.

In the drawings, Figure 1 represents a two-line system; Fig. 2, a form of traveler or carriage for use thereon, and Fig. 3 a modified form of the invention embodying a three-line system by which a wider field of side haul may be accomplished.

Like letters of reference refer to like parts in the several figures of the drawings.

In Fig. 1 the letter A designates a tramway which may be a fixed support or a standing line supported at its opposite ends upon any suitable standard—for instance, a tree A', as shown—and having the free ends thereof securely fastened. Upon this way a traveler or carriage B is mounted, so that the wheels B' thereof travel upon the standing line A. This traveler may be of any desired construction; but I have shown herein a desirable form specifically claimed in my application filed of even date herewith, in which a haulback sheave or block $B^2$ is mounted at one end of a pivoted arm $B^3$, which carries a rotatable pinion $B^4$, meshing with segmental teeth $B^5$, carried by a cam-brake $B^6$, pivoted in the frame of the traveler, so as to engage the surface of the standing line A and hold the traveler in any desired position when the block $B^2$ drops downward toward a vertical position by the slackening of the haulback-line $C^3$, which passes therethrough. At the opposite side of the traveler a hauling block or sheave $B^7$ is supported from the frame of the traveler through which the hauling-line B passes. The haulback-line C is fastened at one end C' to any suitable support—for instance, A', as shown—and passes through the block $B^2$, thence to a point of fixed support $C^2$, as shown, this point being adapted to be changed in position as it may be desired to return the traveler. Upon the support $C^2$ a block $C^3$ is carried, through which the haulback-line C passes, and extends thence to the hauling-engine E, being there wound upon the usual drum E'. The hauling-line D is provided at its free end D' with suitable means for attachment to a log or other load to be lifted and passed thence through the hauling-block $B^7$ to a drum $E^2$ of the engine E. In the operation of this two-line system it will be seen that if the haulback-line C be slackened the brake upon the traveler is set and the carriage held at any point while the load is being engaged or disengaged. The haulback-line is then tightened sufficient to release the brake and hold it taut while the traveler and load are drawn toward the engine by the hauling-line D until reaching the position shown by dotted lines in Fig. 1, when by slackening the haulback-line the traveler-brake will operate to hold the traveler while the load is disengaged. When it is desired to return the traveler from the engine end of the system for another load, the hauling-line D is attached to the haulback-line C at a point $C^5$ below the block $B^2$ (see dotted lines, Fig. 1) by any suitable means and the engine operated to feed out the hauling-line and wind in the haulback-line, thus first releasing the brake and afterward carrying the free end D' of the hauling-line from the block B² back to the fixed point C², when the outward travel of the traveler is stopped and the slack in the haulback-line sets the brake, so that the hauling-line may be attached to another load to be lifted and conveyed. It will be obvious that the block C³ may be changed in position at any time, so as to return the hauling-line to a desired point, and that this position may extend to either side of the way A for a distance equal to the distance of the traveler from the engine end of the way. The hook of the hauling-line is thus automatically returned to any point desired irrespective of the height of the traveler above that point within the distance limitation just recited. This result is accomplished by the power of the engine alone and at any speed desired, depending upon the gearing of the cableway-engine, so that no handwork is necessary and the difficulty of transporting heavy parts to different points for attachment to a load entirely obviated. By means of the automatic brake operated by the haulback-line the traveler can be held at any point along the way by simply giving the haulback-line slack from the engine, and when it is desired to move the traveler backward the slack of the haulback is likewise taken in to permit this backward movement, so that the brake is never applied except when desired and when the haulback-line is slackened. In this form of the invention the haulback-line may be used to return the end of the hauling-line as well as operating the automatic brake. A special advantage is secured in providing the haulback-block upon the traveler, whereby the strain upon the haulback-line is greatly reduced, permitting the use of a lighter line, which in many instances can be waste line utilized from other portions of the system. Furthermore, the automatic brake prevents the moving of the traveler forward while the load is being hoisted to the way and also prevents any movement of the traveler backward to the center of gravity when the haulback and the hauling-line are both slackened for the purpose of removing the load.

In Fig. 3 a three-line system is shown, in which the tram or cable way A is mounted at its opposite ends A', as in Fig. 1, and provided with a similar construction of traveler B. The hauling-line D is also similar to that heretofore shown and extends to a drum F' upon a three-drum engine F. The haulback-line G for the traveler is fixed at its end G' and extends through the haulback-block D² of the traveler, thence through the block G² upon the support A, and thence to a winding-drum F² of the engine. If desired, this line may be passed between suitable guide-wheels B⁸, carried upon a plate B⁹ at one side of the traveler, and the slackening of this haulback-line operates the automatic brake, as heretofore described, while the tightening of the line relieves the brake. For the purpose of returning the free end D' of the hauling-line an auxiliary haulback-line H is provided and at its free end H' connected to the hauling-line. It passes thence through a block H², mounted upon a fixed support, and at its opposite end is wound upon a drum F³ of the engine, so as to be withdrawn from said drum as the hauling-line is drawn upward and inward, while a rewinding of the auxiliary haulback-line upon the drum returns the free end D' of the hauling-line to the block H² and also determines the position of the traveler. The distance of side or lateral haul under the three-line system is limited only by the length of cable used, and it will be noted that the haulback-line G controls the automatic brake, while the line H controls the return of the hauling-line to any point desired. This arrangement of the line G is to reduce the size of the line used, as the strain thereon is the same as upon the hauling-line. By using the haulback-block upon the traveler the necessary strength of haulback-line is reduced one-half, although a greater length of this line is necessary. It will be seen, however, that this automatic brake can be operated by other arrangements of the line G than that herein shown, and under such condition the weight of the block and its supporting-arm with a single-strand haulback-line is sufficient to operate the automatic brake upon the traveler. The auxiliary haulback-line H may be a small wire rope having one end attached to the hook of the hauling-line and its opposite end to the haulback-drum. This auxiliary line passes through the block H², which may be located at any point to which it is desired to return the hook of the hauling-line. The method of operation is similar to that described for the two-line system, excepting that instead of attaching the hook of the hauling-line to the outgoing of the haulback-line the hook is returned by taking in the auxiliary haulback-line. When the load is to be lifted and drawn in, the line H is gradually slackened, and as it is independent of the automatic brake of the traveler the latter is not affected thereby.

The two-line method can be applied to any outfit now in use, although when a new outfit is to be constructed and especially designed for the work the three-line system is found desirable. It will also be noted that this system can be applied to any character of hauling, but for the purposes of illustration has herein been shown as arranged for a logging-outfit. In the three-line system the auxiliary line for returning the end of the hauling-line to where it is wanted to take up its load may be suspended from any point other than from the main supports for the way, so that it is entirely out of the way, while by an arrangement of friction upon the drum of the auxiliary line it can be automatically taken up while the hook is being returned to where it receives its load and automatically played out when hauling in with the load.

It will be obvious that changes may be made in the details of construction and configuration, as well as in the character of tram or cable way used and the traveler mounted thereon, without departing from the spirit of the invention as defined by the appended claims.

Having described my invention and set forth its merits, what I claim, and desire to secure by Letters Patent, is—

1. The combination of a way, a traveler mounted thereon provided with a brake to engage the way, a haulback-block upon said traveler adapted to operate said brake, and a haulback-line extending through said block for operating the traveler when taut and setting said brake when slackened; substantially as specified.

2. The combination of a way, a traveler mounted thereon provided with a brake to engage the way, a haulback-block upon said traveler adapted to operate said brake, and a haulback-line extending from said block for operating the same and having one end attached to a fixed support and the other to a hauling-engine; substantially as specified.

3. The combination of a way, a traveler mounted thereon provided with a brake to engage the way, a haulback-block upon said traveler adapted to operate said brake, a haulback-line extending from said block for operating the same and having one end attached to a fixed support and the other to a hauling-engine, a hauling-line carried by said traveler, and means for returning the free end of said line to a fixed point; substantially as specified.

4. The combination of a way, a traveler mounted thereon, a hauling-line extending through a block carried by said traveler, and a haulback-line extending from a fixed point adapted to be connected to the hauling-line for returning the same to said fixed point; substantially as specified.

5. The combination of a way, a traveler mounted thereon, and provided with a brake to engage said way, a haulback-block carrying an operating-arm for said brake, and a haulback-line extending from a fixed point through said block to engage the brake with the way when the said line is slackened and to disengage the brake when the line is taut; substantially as specified.

6. The combination of a way, a traveler mounted thereon and provided with a brake to engage said way, a haulback-block carrying an operating-arm for said brake, a haulback-line extending from a fixed point through said block to engage the brake with the way when the said line is slackened and to disengage the brake when the line is taut, a hauling-block carried by said traveler, and a hauling-line passing through said block for the purpose of moving the traveler in one direction; substantially as specified.

7. The combination of a way, a traveler mounted thereon and provided with a brake to engage said way, a haulback-block carrying an operating-arm for said brake, a haulback-line extending from a fixed point through said block to engage the brake with the way when the said line is slackened and to disengage the brake when the line is taut, a hauling-block carried by said traveler, a hauling-line passing through said block for the purpose of moving the traveler in one direction, a hauling-engine, and means extending therefrom to a fixed point for returning the free end of the hauling-line to said point; substantially as specified.

In testimony whereof I affix my signature in presence of two witnesses.

FRANK H. LAMB.

Witnesses:
M. LENFESTY,
D. R. JONES.